US012134376B2

(12) United States Patent
Yuan et al.

(10) Patent No.: US 12,134,376 B2
(45) Date of Patent: Nov. 5, 2024

(54) ELECTRICAL POWER CONSERVATION DURING BRAKING FOR AUTONOMOUS OR ASSISTED DRIVING VEHICLES

(71) Applicant: Baidu USA LLC, Sunnyvale, CA (US)

(72) Inventors: Baoping Yuan, Sunnyvale, CA (US); Yaoming Shen, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 231 days.

(21) Appl. No.: 17/934,116

(22) Filed: Sep. 21, 2022

(65) Prior Publication Data
US 2024/0101083 A1    Mar. 28, 2024

(51) Int. Cl.
| | |
|---|---|
| *B60T 13/74* | (2006.01) |
| *B60T 8/172* | (2006.01) |
| *B60T 13/12* | (2006.01) |
| *B60T 17/22* | (2006.01) |

(52) U.S. Cl.
CPC ............ *B60T 8/172* (2013.01); *B60T 13/745* (2013.01); *B60T 17/22* (2013.01); *B60T 2201/06* (2013.01); *B60T 2210/20* (2013.01)

(58) Field of Classification Search
CPC ......... B60T 13/74; B60T 13/745; B60T 7/122
See application file for complete search history.

(56) References Cited

U.S. PATENT DOCUMENTS

| | | | |
|---|---|---|---|
| 2016/0200298 A1* | 7/2016 | Saito | B60T 8/36 |
| | | | 701/70 |
| 2018/0079403 A1* | 3/2018 | Masuda | B60T 8/172 |
| 2018/0347530 A1* | 12/2018 | Le | F02N 11/084 |
| 2020/0130655 A1* | 4/2020 | Hashimoto | B60T 13/16 |
| 2021/0122349 A1* | 4/2021 | Leiber | B60T 7/042 |
| 2022/0194343 A1* | 6/2022 | Farres | B60T 13/261 |

* cited by examiner

*Primary Examiner* — Long T Tran
(74) *Attorney, Agent, or Firm* — WOMBLE BOND DICKINSON (US) LLP

(57) ABSTRACT

This disclosure provides systems and methods for electrical power conservation during braking for autonomous or assisted driving vehicles, such as when electrical currents are continuously supplied to the brake system when the vehicle is temporarily halted at a slope. Braking hysteresis is the relationship between the input (e.g., operating pressure, caused by an electrical motor to increase the fluid pressures in the brake system) and the output (e.g., braking pressure applied by the brake pads on the rotors), in which the change of the output is different during the increase of the input and during the decrease of the input. The present disclosure provides techniques for conserving electrical power consumption by using the brake hysteresis.

20 Claims, 14 Drawing Sheets

ELECTRICAL POWER CONSERVATION DURING BRAKING FOR AUTONOMOUS OR ASSISTED DRIVING VEHICLES

TECHNICAL FIELD

Embodiments of the present disclosure relate generally to operating autonomous driving vehicles. More particularly, embodiments of the disclosure relate to power consumption.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Brake control is a critical operation. As most autonomous or assisted driving (AD) vehicles use electrical power to operate the braking system (e.g., either indirectly via a hydraulic/pneumatic system in which an electrical motor powers a pump or a valve; or directly actuating a component that causes friction). The braking system may consume electricity in wasteful manners and reduce overall operational efficiency. For example, when a vehicle is held still during operation (e.g., without mechanical locking engagement), the electrical power consumption in the braking system may be significant regardless how much braking power is required to hold the vehicle still. Such wasteful operation may negatively impact other aspects of operation that requires electrical power (e.g., restarting an internal combustion engine).

BRIEF DESCRIPTION OF THE DRAWINGS

Embodiments of the disclosure are illustrated by way of example and not limitation in the figures of the accompanying drawings in which like references indicate similar elements.

Like reference numerals indicate like elements.

DETAILED DESCRIPTION

Figure 1:
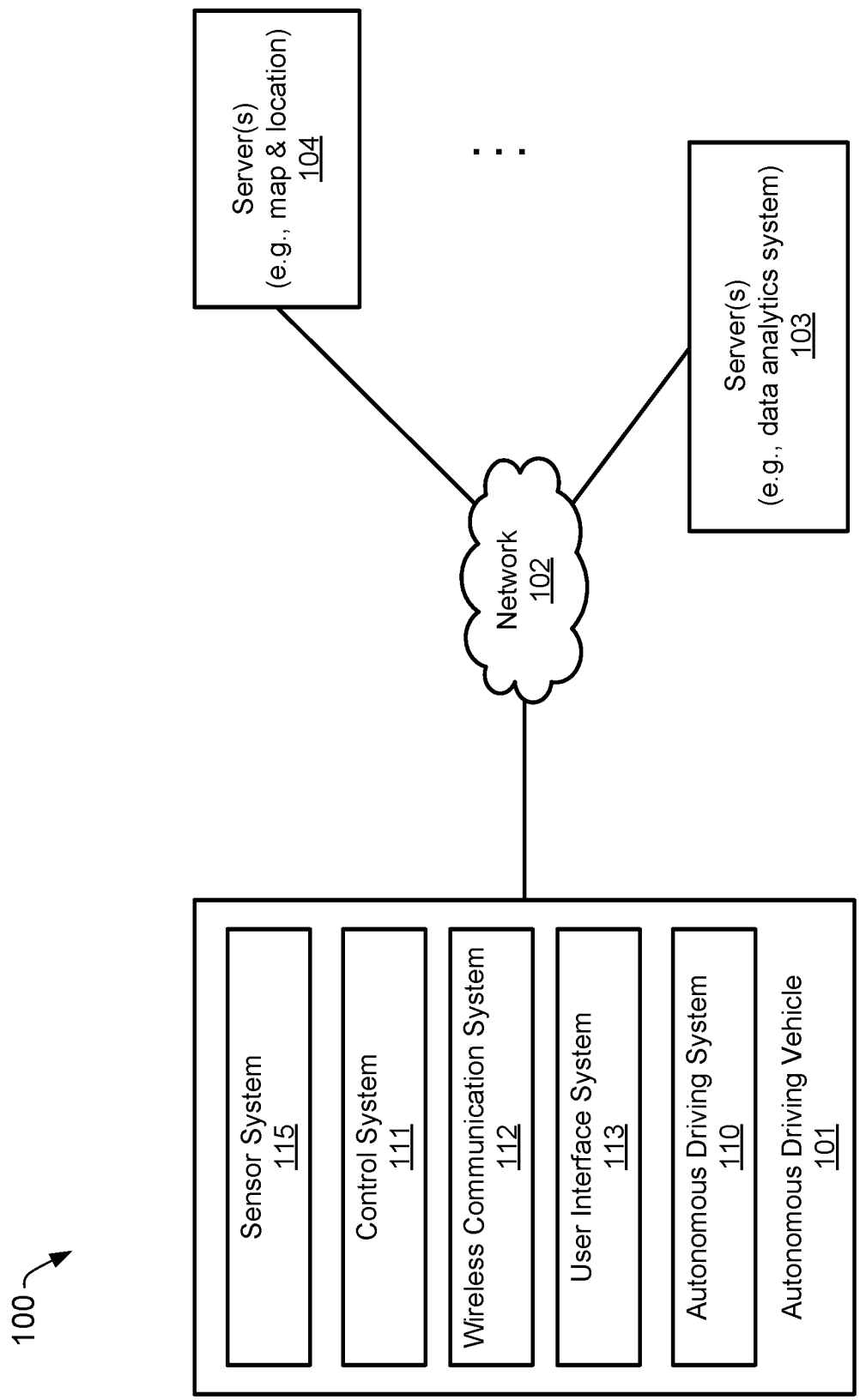
FIG. 1 is a block diagram illustrating a networked system, in accordance with aspects of the present disclosure.

Various embodiments and aspects of the disclosures will be described with reference to the details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, the present disclosure provides systems and methods for electrical power conservation during braking for autonomous or assisted driving vehicles, such as when electrical currents are continuously supplied to the brake system when the vehicle is temporarily halted at a slope. For example, during a traffic stop on a slope, a vehicle may temporarily operate at a full stop using the regular braking system (e.g., as compared to the parking brake system). The electrical power spent on the regular braking system often exceeds the actual power requirements for keeping the vehicle still, due to the nature of brake hysteresis and that static friction is greater than kinetic friction. Braking hysteresis is the relationship between the input (e.g., operating pressure, caused by an electrical motor to increase the fluid pressures in the brake system) and the output (e.g., braking pressure applied by the brake pads on the rotors), in which the change of the output is different during the increase of the input and during the decrease of the input. The present disclosure provides techniques for conserving electrical power consumption by using the brake hysteresis, for enabling a better use of the conserved electrical power (e.g., restarting the engine in a hybrid mode).

The disclosed method may be implemented in autonomous driving or assisted driving (AD) vehicles, as well as human-operated vehicles that use an electrical booster to regulate the braking system. The example method may be implemented by a computer (e.g., an electronic control unit (ECU)) for reducing electrical current in vehicle braking for power conservation. The example method may include applying a first electrical current to a braking system of a vehicle after the vehicle has ceased movement on a slope. The first electrical current prevents the vehicle from moving on the slope. The computer may determine a first braking pressure based on the first electrical current and the slope. The computer may then determine a second electrical current based on the first braking pressure and a braking hysteresis. The second electrical current is lower than the first electrical current. The computer then reduces the first electrical current to the second electrical current in the braking system.

In existing practice, an electrical current (e.g., up to tens of Amps, such as 80 A) used to cause a vehicle to cease movement is often maintained during a traffic stop, which may last for minutes (e.g., 3 minutes or more). Because the durations of such stops are often not certain, parking brakes (e.g., passive brakes) are not used in view of the trouble and delay in restarting the vehicle. When the power consumption at the braking system is not well-managed (e.g., overspending electricity), the overall power supply to the vehicle may suffer from significant and unnecessary voltage and/or current drop. Such drops may negatively impact operations of other aspects of the vehicle (e.g., power train, computer, etc.). Moreover, when the vehicle is stopped on a gradient, the power consumption by the braking system is continuous and substantial, causing a significant drain to the power supply. The present disclosure provides methods to reduce or minimize power consumptions by the braking system in such situations without compromising the safety of the braking system.

As discussed below, the present disclosure makes use of the brake hysteresis characteristics, which provides a same level of brake pressure output (e.g., braking pressure applied from braking pads to rotors, proportional to the resulting friction) while the electrical current input is meaningfully dropped. This way, the voltage drops or the power consumption can be reduced or minimized. Since most vehicles utilize electricity for computerized control regardless of the power source for the power train, the electrical power consumption in ADV in such braking situations may be reduced for any vehicle type (e.g., pure electrical vehicles, hybrid power vehicles, or pure internal combustion engine powered vehicles).

The conserved energy may be used in other aspects of operations in the vehicle, such as engine restart or similar operations that require a high current draw. In other words, the techniques herein may apply to any vehicle types that have an electrical motor for causing braking pressure to vary. For illustrative purposes, autonomous driving vehicles are discussed in the following examples, but the disclosed techniques are applicable to other assisted driving or remote-controlled vehicles having electrically controlled braking systems.

FIG. 1 is a block diagram illustrating an autonomous driving network configuration, in accordance with aspects of the present disclosure of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
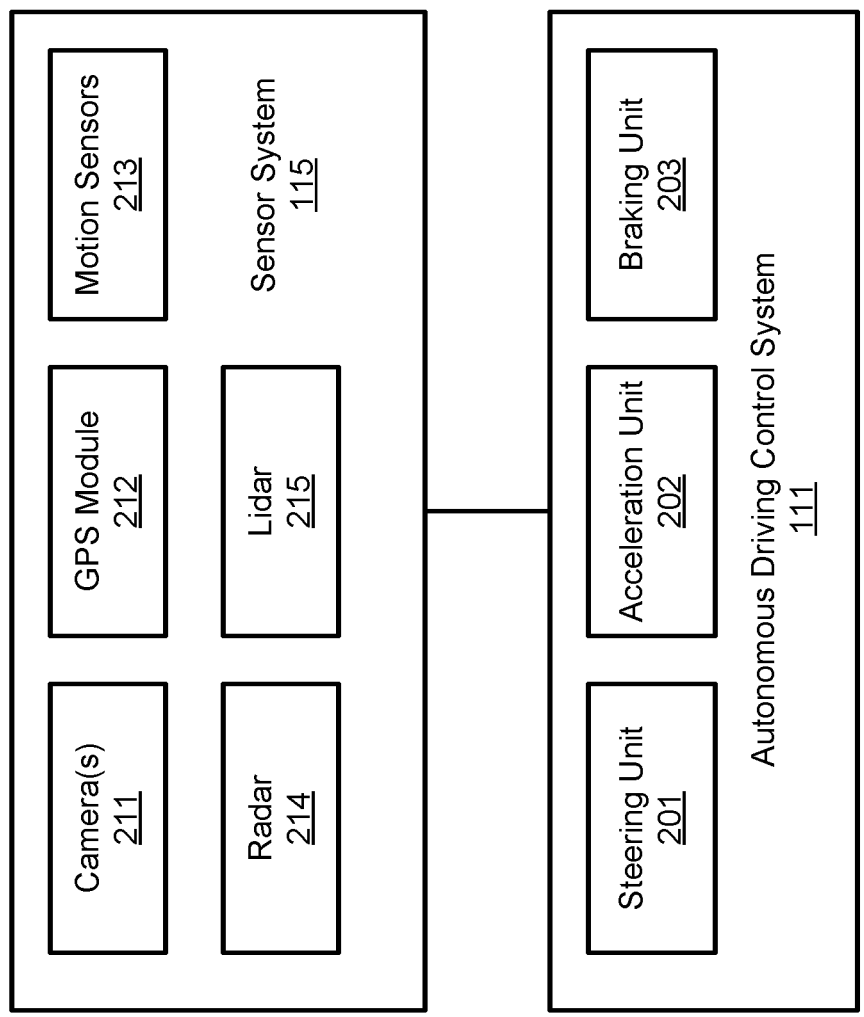
FIG. 2 is a block diagram illustrating an example of an autonomous/assisted driving (AD) vehicle, in accordance with aspects of the present disclosure.

Referring now to FIG. 2, in one embodiment, sensor system 115 includes, but it is not limited to, one or more cameras 211, global positioning system (GPS) unit or module 212, motion sensors 213 (e.g., an inertial measurement unit (IMU), an accelerometer, etc.), radar unit 214, and a light detection and range (LIDAR) unit 215. The GPS module 212 may include a transceiver operable to provide information regarding the position of the ADV. The motion sensors 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, a steering unit 201, an acceleration unit 202, and a braking unit 203. The steering unit 201 is to adjust the direction or heading of the vehicle. The acceleration unit 202 is to control the speed of the motor or engine that in turn controls the speed and acceleration of the vehicle. The steering unit 201 and the acceleration unit 202 may be coupled, in part, with the AD control 510 of FIG. 5. The braking unit 203 is to decelerate the vehicle by providing friction to slow the wheels or tires of the vehicle. The braking unit 203 may be coupled, in part, with the brake control 520 of FIG. 5. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3:
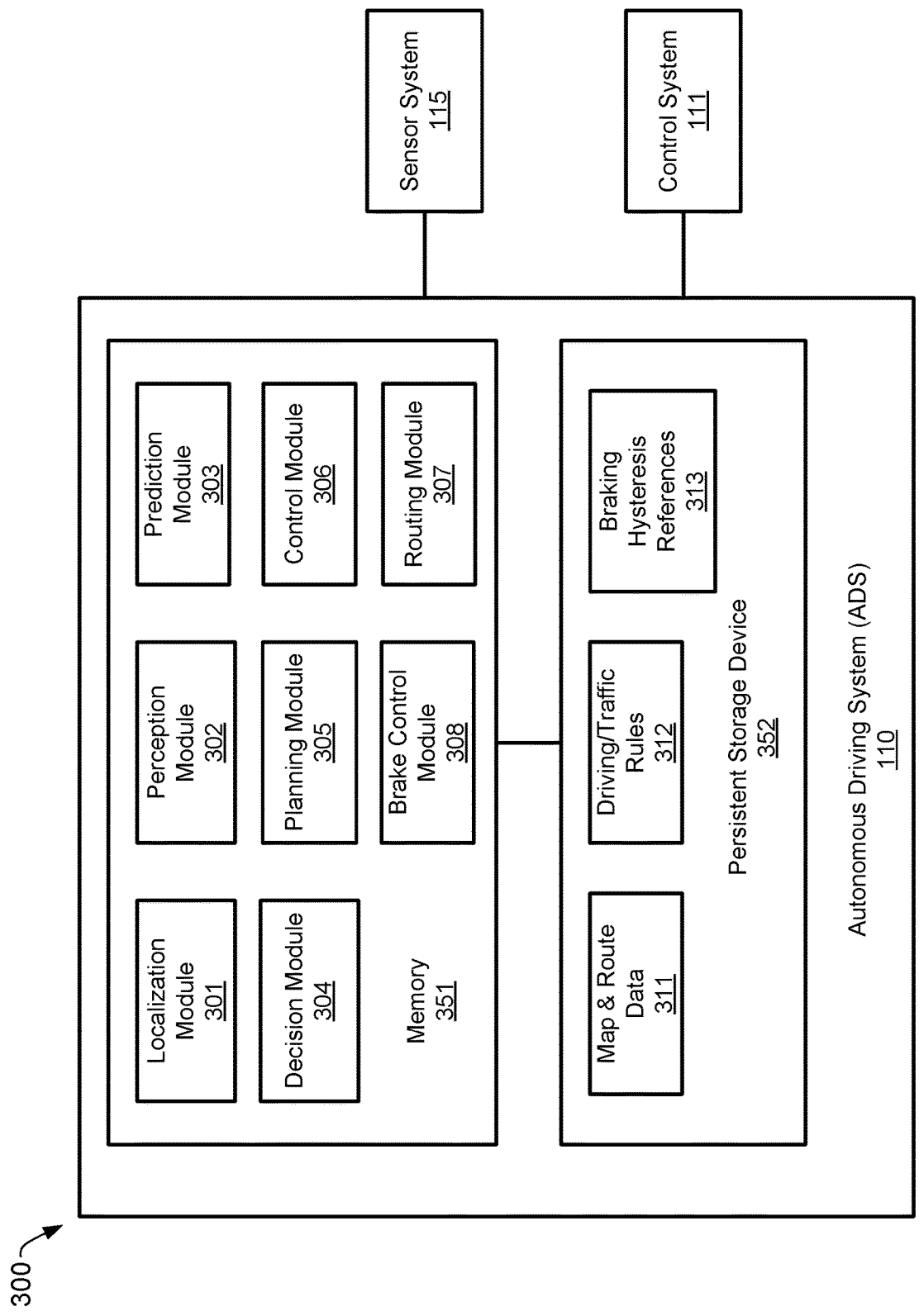
FIG. 3 is a block diagram illustrating an example of an AD system for an autonomous driving vehicle, in accordance with aspects of the present disclosure.

FIG. 3 is a block diagram illustrating an example of an AD system for an autonomous driving vehicle. The system 300 may be implemented as a part of ADV 101 of FIG. 1 including, but is not limited to, ADS 110, control system 111, and sensor system 115. Referring to FIG. 3, the ADS 110 includes, but is not limited to, a localization module 301, a perception module 302, a prediction module 303, a decision module 304, a planning module 305, a control module 306, a routing module 307, and a brake control module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

The localization module 301 determines a current location of the ADV 300 (e.g., leveraging GPS module 212) and manages any data related to a trip or route of a user. The localization module 301 (also referred to as a map and route module) manages any data related to a trip or route of a user. A user may log in and specify a starting location and a destination of a trip, for example, via a user interface. The localization module 301 communicates with other components of the ADV 300, such as map and route data 311, to obtain the trip related data. For example, the localization module 301 may obtain location and route data from a location server and a map and POI (MPOI) server. A location server provides location services and an MPOI server provides map services and the POIs of certain locations, which may be cached as part of map and route data 311. While the ADV 300 is moving along the route, the localization module 301 may also obtain real-time traffic information from a traffic information system or server.

Based on the sensor data provided by sensor system 115 and localization information obtained by the localization module 301, a perception of the surrounding environment is determined by the perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

The perception module 302 may include a computer vision system or functionalities of a computer vision system to process and analyze images captured by one or more cameras in order to identify objects and/or features in the environment of the ADV 300. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. The perception module 302 can also detect objects based on other sensors data provided by other sensors such as a radar and/or LIDAR.

For each of the objects, the prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, the prediction module 303 will predict whether the vehicle will likely move straight forward or make a turn. If the perception data indicates that the intersection has no traffic light, the prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), the decision module 304 decides how to encounter the object (e.g., overtake, yield, stop, pass). The decision module 304 may make such decisions according to a set of rules such as traffic rules or driving rules 312, which may be stored in the persistent storage device 352. The persistent storage device 352 may include braking hysteresis references 313.

The routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. The routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line.

The topographic maps are then provided to the decision module 304 and/or planning module 305. The decision module 304 and/or planning module 305 may examine all of the possible routes to select and modify one of the most optimal routes in view of other data provided by other modules such as traffic conditions from the localization module 301, driving environment perceived by the perception module 302, and traffic condition predicted by the prediction module 303. The actual path or route for controlling the ADV may be close to or different from the reference line provided by the routing module 307 dependent upon the specific driving environment at the point in time.

Based on a decision for each of the objects perceived, the planning module 305 plans a path or route for the ADV, as well as driving parameters (e.g., distance, speed, and/or turning angle), using a reference line provided by the routing module 307 as a basis. That is, for a given object, the decision module 304 decides what to do with the object, while the planning module 305 determines how to do it. For example, for a given object, decision module 304 may decide to pass the object, while the planning module 305 may determine whether to pass on the left side or right side of the object. Planning and control data is generated by planning module 305 including information describing how the vehicle 101 would move in a next moving cycle (e.g., next route/path segment). For example, the planning and control data may instruct the vehicle 101 to move 10 meters at a speed of 30 miles per hour (mph), then to change to a right lane at the speed of 25 mph.

Based on the planning and control data, the control module 306 controls and drives the ADV, by sending proper commands or signals to the vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, the planning module 305 plans a next route segment or path segment, for example, including a target position and the time required for the ADV to reach the target position. Alternatively, the planning module 305 may further specify the specific speed, direction, and/or steering angle, etc. In one embodiment, the planning module 305 plans a route segment or path segment for the next predetermined period of time such as 5 seconds. For each planning cycle, the planning module 305 plans a target position for the current cycle (e.g., next 5 seconds) based on a target position planned in a previous cycle. The control module 306 then generates one or more control commands (e.g., throttle, brake, steering control commands) based on the planning and control data of the current cycle.

Note that the decision module 304 and the planning module 305 may be integrated as an integrated module. The decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via the user interface system 113. The navigation system may update the driving path dynamically while the ADV is in operation. The navigation system can incorporate data from a GPS system and one or more maps so as to determine the driving path for the ADV.

Figure 4:
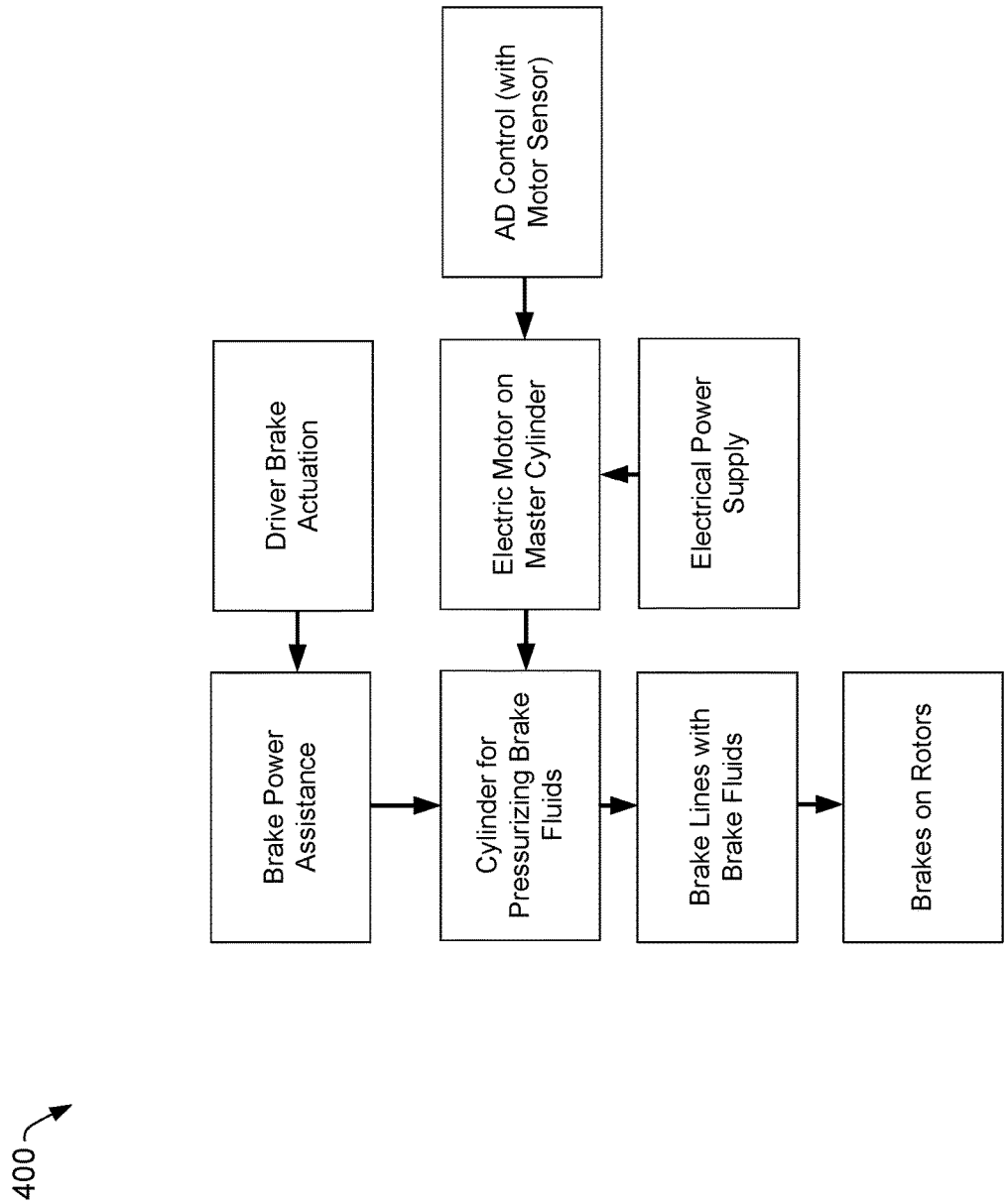
FIG. 4 is a block diagram illustrating an example of a braking system, in accordance with aspects of the present disclosure.
Figure 5:
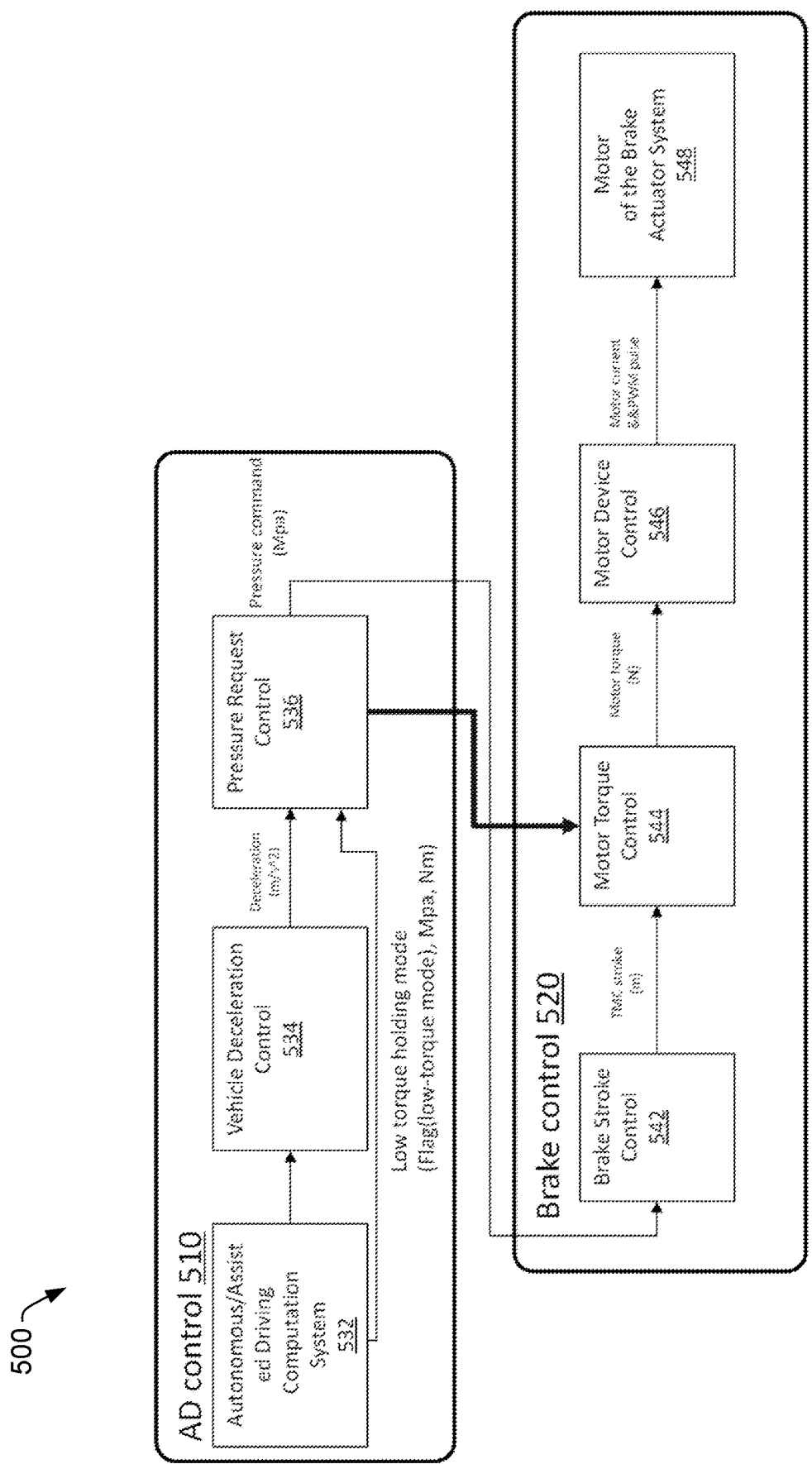
FIG. 5 is a block diagram illustrating implementations of an AD control and a brake control, in accordance with aspects of the present disclosure.

The brake control module 308 of FIG. 3 may be similar to (or functionally equivalent to) the brake control 520 of FIG. 5, in control of an example brake system 400 of FIG. 4. FIG. 4 is a block diagram illustrating an example of the braking system 400, in accordance with aspects of the present disclosure. As shown in FIG. 4, the braking system 400 includes at least a mechanism for receiving a braking actuation from a driver, a device for providing brake power assistance (e.g., a booster), a cylinder (e.g., a master cylinder) for pressurizing brake fluids, an electrical motor on the master cylinder, one or more brake lines with brake fluids for transmitting braking power to one or more brakes on rotors of the vehicle. The braking system 400 may also include an electrical power supply, independent from or shared with the vehicle. The braking system 400 may include or in connection with the AD control (such as the AD control 510 of FIG. 5) that operates on the mentioned components/devices with sensor feedbacks therefrom.

Although illustrated separately, the device providing brake power assistance and the electric motor on the master cylinder may be integrated into a common device. For example, the brake actuation by the driver may provide direct actuation to the electric motor on the master cylinder. In other embodiments, the brake power assistance device may be a separate or independent (e.g., hydraulic) system to provide secondary control of the master cylinder, such as for emergency engagement by the driver when AD control does not operate as intended. As discussed herein, the brake control module 308 may reduce the power consumption by the electric motor on the master cylinder to conserve energy when the vehicle performs a traffic stop on a slope or gradient.

FIG. 5 is a block diagram 500 illustrating implementations of an AD control 510 and a brake control 520, in accordance with aspects of the present disclosure. As shown, the AD control 510 includes an autonomous or assisted driving (AD) computation system 532, a vehicle deceleration control 534, and a pressure request control 536. The AD computation system 532 may identify a situation where active deceleration of the vehicle is required, such as in view of traffic and/or road conditions (e.g., obstacles). Active decelerations may include braking using the braking system as well as deceleration by converting kinetic energy into electricity (while passive decelerations may include decelerations caused by friction and aerodynamic drag). The vehicle deceleration control 534 may determine a response (e.g., identifying a proper mode for deceleration) based on the availability of travel distance and time, to engage one or more of the deceleration methods.

When the vehicle deceleration control 534 determines that the braking system needs be activated to slow down the vehicle, the vehicle deceleration control 534 may provide a desired rate of deceleration to the pressure request control 536, which activates the brake control 520 with pressure commands and torque commands. In some cases, such as when the vehicle is in a low torque holding mode, the AD driving computation system 532 may directly communicate with the pressure request control 536 without data processing by the vehicle deceleration control 534.

The brake control 520 takes the pressure and torque commands from the AD control 510 and executes the commands in the braking system. As shown, the brake control 520 includes a brake stroke control 542, a motor torque control 544, a motor device control 546, and a motor 548 of the brake actuation system (e.g., the braking system). The brake stroke control 542 may convert the pressure commands (e.g., the pressures applied by the driver and amplified by the brake booster) into hydraulic pressures in a tandem master cylinder (TMC) stroke. The motor torque control 544 receives the hydraulic pressures and computes corresponding motor torques required for the motor 548. The motor device control 546 then converts the required motor torques into motor current and/or pulse-width modulation (PWM) voltage signals for the motor 548.

According to aspects of the present disclosure, energy conservation may be achieved by reducing the actual electrical current or energy consumption at the motor 548 without giving up braking torque output at the brakes based on hysteresis characteristics of the braking system. The reduction of the electrical current may be controlled at various points in the block diagram 500, such as the pressure request control 536. For example, the pressure request control 536 may include or have access to the characteristics of braking characteristics of the braking system and determine a reduction of pressure values in the pressure command to the brake stroke control 542 and/or determine a reduction of torque (e.g., by providing a value of correction/delta) to the motor torque control 544. An example of the characteristics of braking characteristics of the braking system is illustrated in FIG. 6 and discussed below.

Figure 6:
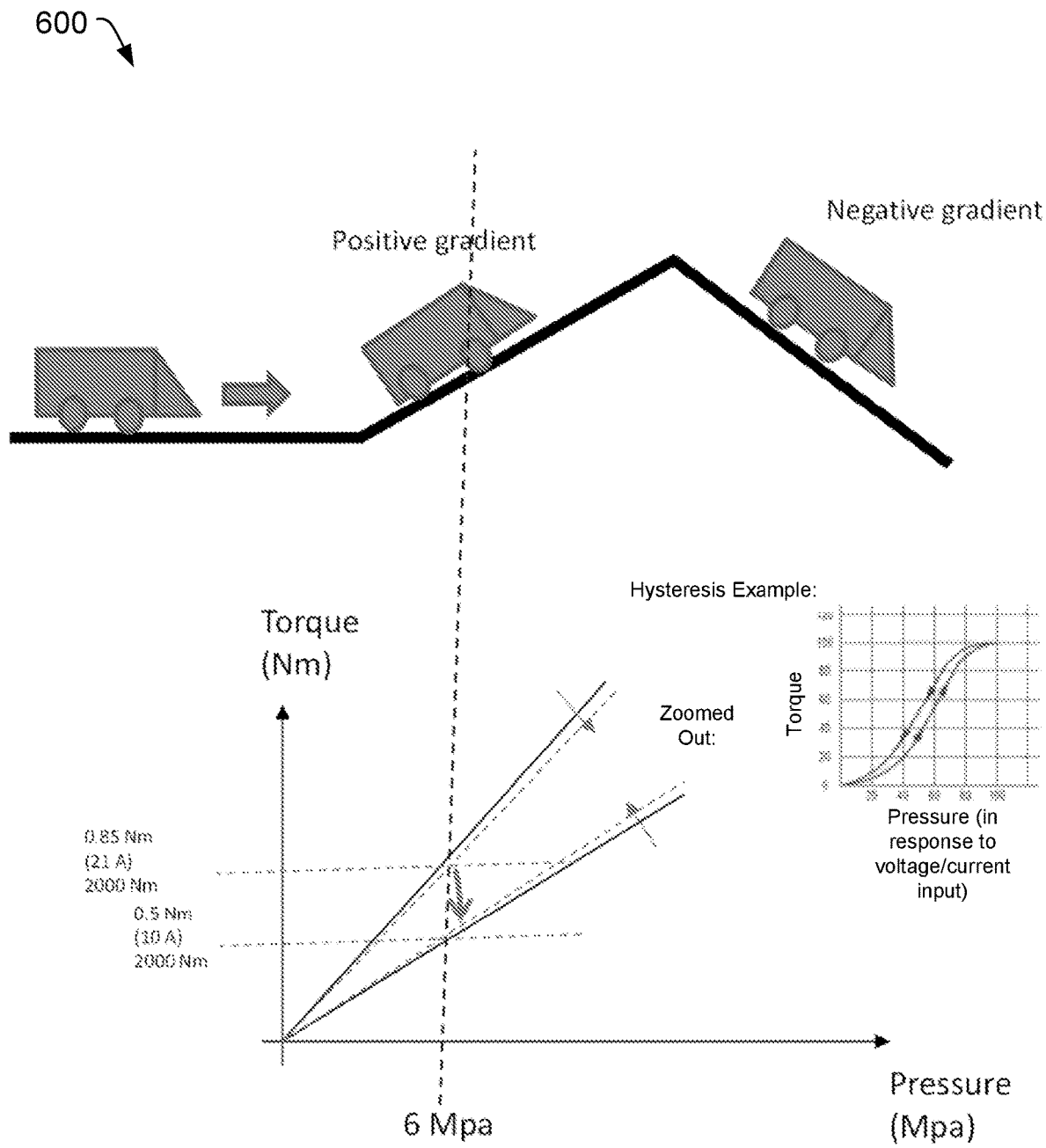
FIG. 6 illustrates an example application of braking hysteresis for reducing power consumption in a braking system, in accordance with aspects of the present disclosure.

FIG. 6 illustrates an example application 600 of braking hysteresis for reducing power consumption in a braking system, in accordance with aspects of the present disclosure. As shown in the hysteresis example in FIG. 6, the braking pressure may cause different braking torque responses when the brake pressure increases than when the brake pressure decreases. In other words, a same braking torque output may be realized at two different braking pressure input values. The difference provides room for reducing the electrical power consumption at the motor 548 of FIG. 5.

As shown in FIG. 6, a vehicle (e.g., an ADV) may be halted at a traffic stop on a slope (e.g., at a positive gradient or a negative gradient). In such cases, the braking system continues to operate even when the vehicle has reached a full stop, at which point the braking torque counteracts a gravitational force component along the slope. For illustrative purposes, suppose a braking pressure of 6 mega Pascal (MPa) is required to safely hold the vehicle still on the slope, an initial braking torque for producing the 6 MPa is 0.85 Nm, provided by the electric motor at 21 A. Because of the braking hysteresis characteristics, however, the braking torque may be reduced to 0.5 Nm, provided by the electric motor at 10 A, while maintaining the braking pressure at 6 MPa. By reducing the electrical current at the motor, significant electrical power is conserved. As a result, substantial voltage drops at the power supply (e.g., a direct current battery) may be reduced or prevented.

Figure 7:
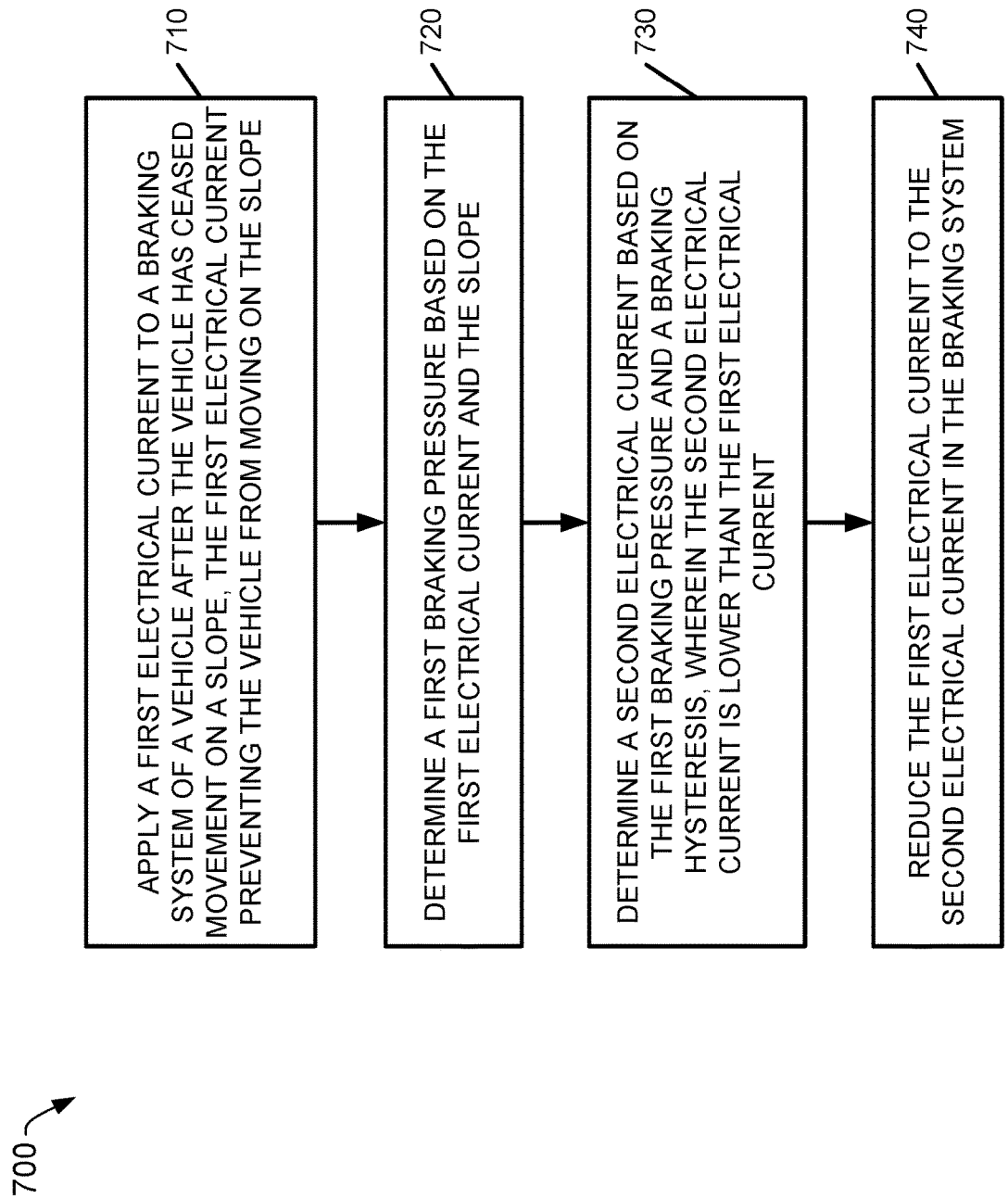
FIG. 7 is a flow diagram illustrating a method of reducing electrical current in a braking system, in accordance with aspects of the present disclosure.

FIG. 7 is a flow diagram 700 illustrating a method of reducing electrical current in a braking system, in accordance with aspects of the present disclosure. The method may be performed by a processing logic (e.g., associated with the pressure request control 536 of FIG. 5), which may include software, hardware, or a combination thereof. As an example, the method illustrated in the flow diagram 700 may be performed by the brake control module 308 of FIG. 3.

At operation 710, a brake control module (e.g., a processing device) applies a first electrical current (e.g., 21 A shown in FIG. 6) to a braking system of a vehicle after the vehicle has ceased movement on a slope. The first electrical current preventing the vehicle from moving on the slope by producing a braking pressure sufficient to counteract the gravitational or engine idling forces. In some cases, the brake control module may determine that the vehicle is on the slope via communication with other operating devices or modules in the vehicle, based on at least one of map information, sensor information, or feedback from the brake system. For example, the brake control module may determine that the vehicle is on the slope based on feedback from the brake system by monitoring movement (as well as the rate thereof) of the rotors when the braking pressures are decreased.

At operation 720, the brake control module determines a first braking pressure (e.g., 6 MPa shown in FIG. 6) based on the first electrical current and the slope. For example, the first electrical current may correspond to a braking actuation resulting in a pressure value measurable directly or in a look-up table corresponding to the electrical current. The braking pressure may also correspond to a gravitational component computed from the mass of the vehicle and the slope, which may be used to validate the pressure value obtained from the first electrical current directly or indirectly.

At operation 730, the brake control module determines a second electrical current (e.g., 10 A shown in FIG. 6) based on the first braking pressure (e.g., 6 MPa) and a braking hysteresis. The second electrical current is lower than the first electrical current. In some embodiments, determining the second electrical current may include ascertaining the braking hysteresis in a look-up table constructed of values of braking pressures and torques measured at multiple brakes of the braking system. The values of the braking pressure correspond to variable electrical current inputs to the braking system. The different electrical current inputs may result in different braking torques, allowing for plotting the braking hysteresis characteristics.

As the second electrical current is less than the first electrical current, at operation 740, the brake control module may reduce the first electrical current to the second electrical current in the braking system for energy conservation. In some cases, the values of braking pressures and torques measured (as well as the corresponding electrical currents) based on the mapped braking hysteresis characteristics are scaled by a safety factor in the look-up table so that the second electrical current is greater than the electrical current corresponding to the same braking pressure in the actual braking hysteresis. The AD control (e.g., the pressure request control 536 of the AD control 510) or the brake control module (e.g., the brake control 520) may obtain the braking hysteresis in one of various methods discussed below.

In some embodiments, the brake control module prevents a voltage of the power system of the vehicle from dropping below a threshold value by using the second electrical current. The brake control module may cause storing electrical energy saved from reducing the first electrical current to the second electrical current for a high current outburst (e.g., for an engine restart after the traffic stop).

Figure 8:
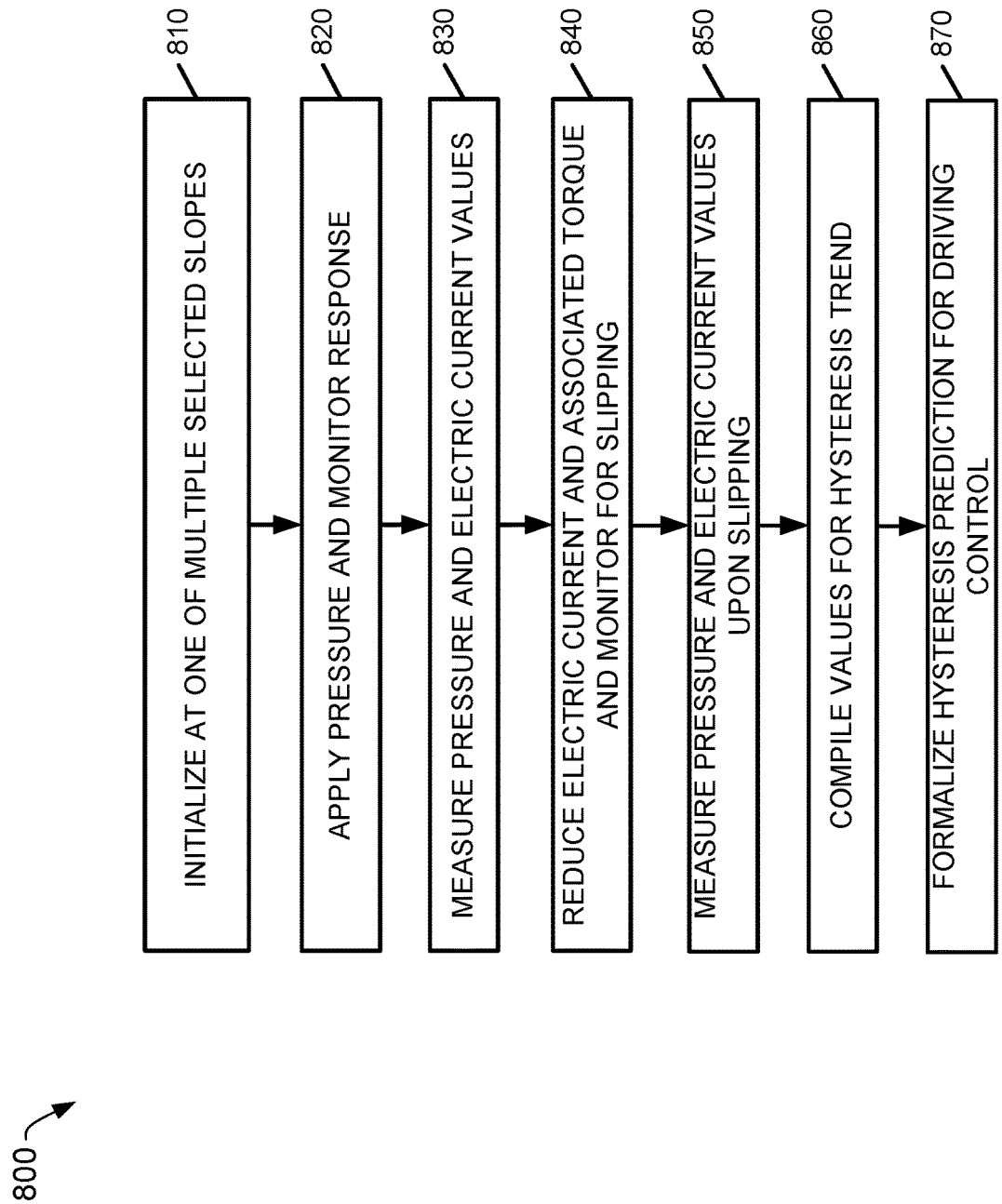
FIG. 8 is a flow diagram illustrating a method of obtaining a hysteresis reference for a braking system, in accordance with aspects of the present disclosure.

FIG. 8 is a flow diagram 800 illustrating a method of obtaining a braking hysteresis reference for a braking system, in accordance with aspects of the present disclosure. In some cases, the method may be performed by a processing logic (e.g., the AD control 510 of FIG. 5), which may include software, hardware, or a combination thereof. In some cases, the method illustrated in the flow diagram 800 may be performed by the brake control module 308 of FIG. 3 or the hysteresis determination module 910 of FIG. 9.

At operation 810, the brake control module may initialize a characterization process at one of multiple selected slopes. The selected slopes may provide a known gradient so that the gravitational force component of the vehicle can be accurately determined. The initialization may also include having the vehicle travel at a constant speed set for the characterization process.

At operation 820, the brake control module may apply braking pressure and monitor the braking response of the vehicle. For example, the braking response may include data of the vehicle deceleration. The braking pressure applied as input may be recorded for verification with actual braking pressure measured.

At operation 830, the brake control module may measure a number of different braking pressures and the corresponding electric current values. The multiple pressure and current values provide data for depicting at least a portion of the braking hysteresis, such as the portion where the electric current increases and causing the braking pressure to increase.

At operation 840, the brake control module may reduce the electric current and the corresponding braking torque and monitor for slipping of the braking system (e.g., when the rotors start moving relative to the brake pads).

At operation 850, the brake control module may measure the braking pressures and the corresponding electric current values when the slipping of the braking system is first detected, such as in the multiple selected slopes. The measurements may include interpolation of braking pressures and electric currents not directly measured.

At operation 860, the brake control module may compile values for hysteresis trends (e.g., by plotting the braking pressure values and the braking torque values).

At operation 870, the brake control module may formalize a braking hysteresis prediction for driving control. For example, the brake control module may apply one or more statistical analysis methods to remove noise or outliers in the measurements. The brake control module may also process the braking hysteresis into specific units suitable for the controlling algorithm(s). In some cases, the brake control module may apply a safety factor when formalizing the braking hysteresis to save computations in subsequent operations.

Figure 9:
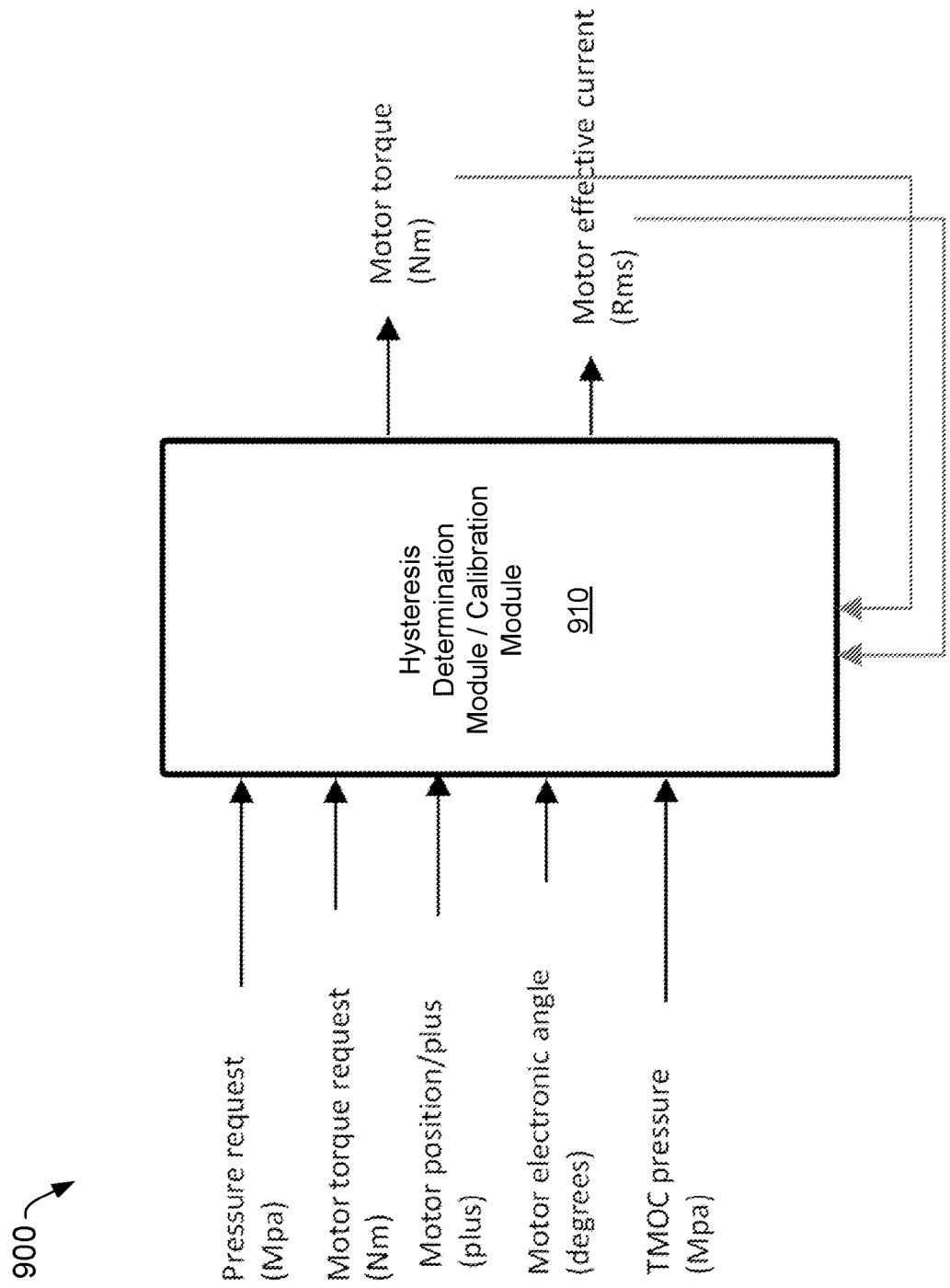
FIG. 9 is a block diagram illustrating operations of a hysteresis determination module, in accordance with aspects of the present disclosure.

FIG. 9 is a block diagram 900 illustrating operations of a hysteresis determination module 910, in accordance with aspects of the present disclosure. As mentioned above, the hysteresis determination module 910 may perform the method illustrated in the flow chart 800, by monitoring and measuring braking pressures, torques, and electric currents for compiling the braking hysteresis characteristics. In some cases, the hysteresis determination module 910 may verify or update the braking hysteresis in regular operations (e.g., in stead of dedicated calibration operations).

During operation, the hysteresis determination module may first move the brake actuator to a home position (e.g., an original position), where the braking pressure is zero. The hysteresis determination module may then receive an initial pressure request, such as 5 MPa, and correspondingly actuate the brake actuator to engage the braking system. When the electric motor has stopped at a position where the braking pressure and the braking torque has reached an equilibrium. At the equilibrium, the torque measurements and the electrical current values are recorded.

As mentioned above, the hysteresis determination module may then reduce the motor torque until the actuator system is starting to allow the vehicle to slip (e.g., by detecting a change of wheel position, such as based on signals of a pulse sensor). The slip may also be indicated by any changes in the motor position, the motor electronic angle, or the transients by the method of characteristics (TMOC) pressure. The torque measurements (e.g., the motor torque) and the corresponding current values (e.g., motor effective current) upon slip are recorded for different braking pressure values.

Figure 10:
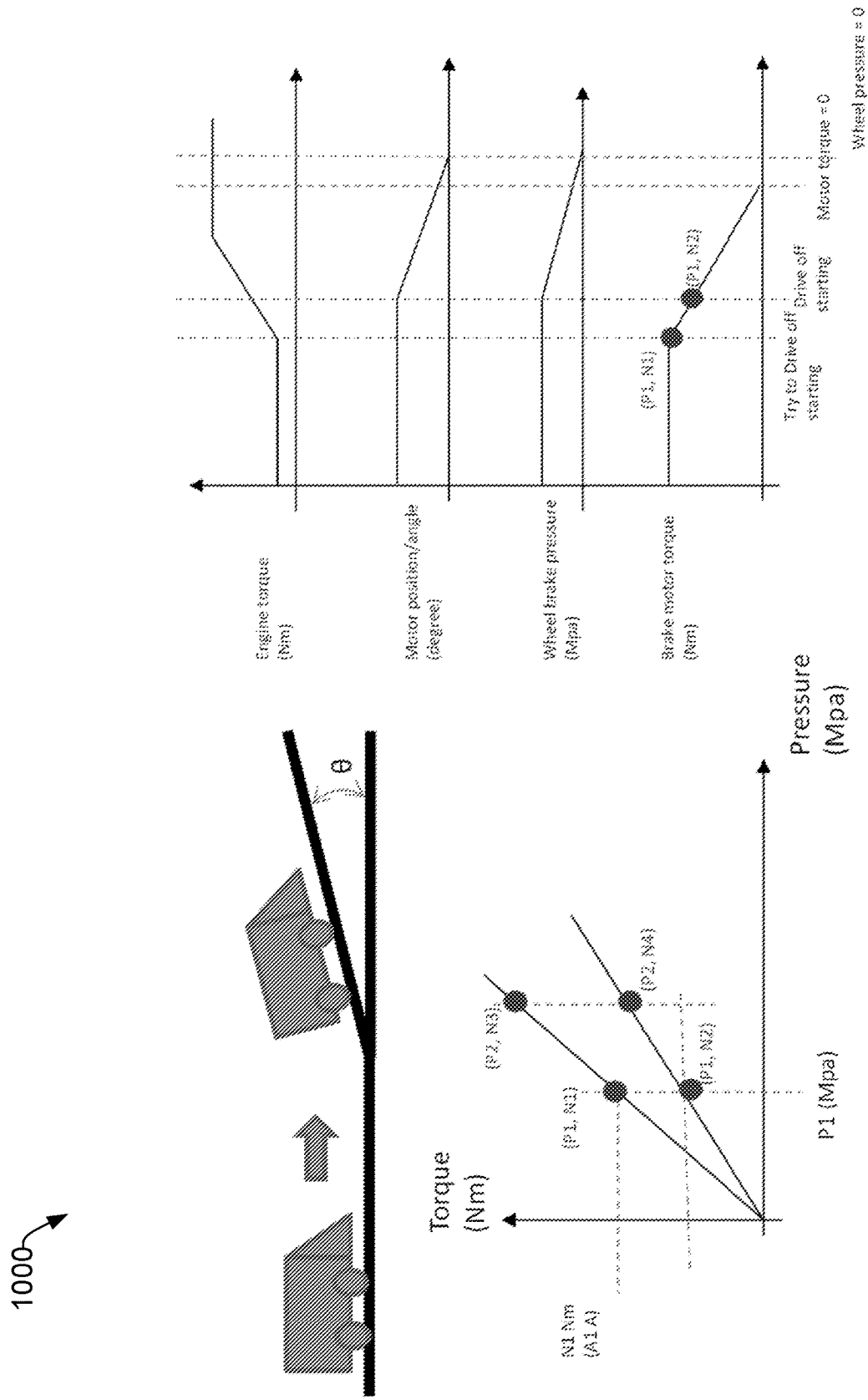
FIG. 10 illustrates an example of determining a hysteresis of braking characteristics, in accordance with aspects of the present disclosure.

FIG. 10 illustrates an example 1000 of determining a hysteresis of braking characteristics, in accordance with aspects of the present disclosure. In the example 1000, discrete values of the braking torques and braking pressures are measured for extrapolating the braking hysteresis characteristics (e.g., in the range of interests). As shown in FIG. 10, the vehicle may, on a slope of known gradient, measure a first pressure (P1) upon braking. The corresponding braking torque (N1) is measured to obtain the data point (P1, N1).

The vehicle then reduces the braking torque to N2 to cause slipping by the brake motor. This allows the second data point (P1, N2) to be recorded. Similarly, a second braking pressure (P2) may be applied to obtain the data points (P2, N3) and (P2, N4). The braking hysteresis curves may then be approximated by drawing the lines (P1, N1) through (P2, N3) and (P1, N2) through (P2, N4). The approximated braking characteristics may further be modified by a safety factor. In some cases, the approximated braking characteristics may be used in low-torque modes of operations of the vehicle.

Figure 11:
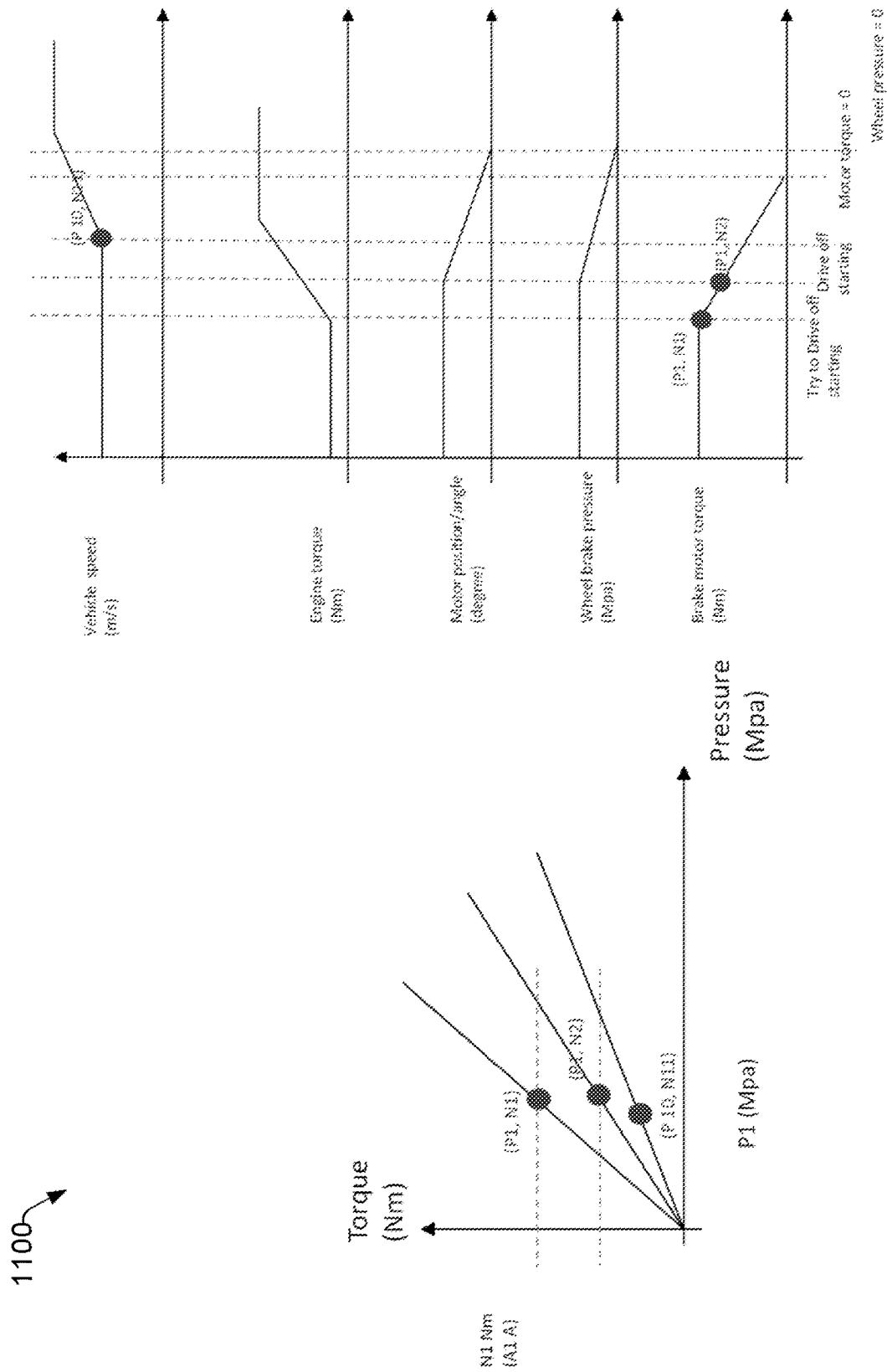
FIG. 11 illustrates an example of determining a hysteresis of braking characteristics, in accordance with aspects of the present disclosure.

FIG. 11 illustrates an example 1100 of determining a hysteresis of braking characteristics, in accordance with aspects of the present disclosure. The example 1100 varies from the example 1000 in that the braking hysteresis characteristics may be validated or updated during operation. In addition to measuring (P1, N1) and (P1, N2) as discussed above, the vehicle may further measure (P10, N11) during acceleration when the engine output torque is greater than zero. The braking hysteresis characteristics may be applicable to a low torque mode in which the braking power is to transition from the braking system to the engine system of the vehicle. For example, when the vehicle is stopped at a positive gradient, the engine torque output may take over the braking system in preventing the vehicle from moving backwards. The engine torque may be converted to the braking pressure P10 by using:

(Engine torque−($Mg \sin(\theta)$−$Mg \cos(\theta)*f)*K2$)/
$K1$=pressure ($P10$), wherein:

f is the friction coefficient;
K2 is the constant for converting force values into torque values; and
K1 is the constant for converting the torque values into braking pressures.

This way, the vehicle may use different engine torque values to obtain different braking pressure values to compile the braking hysteresis characteristics. Application of low torque modes are further discussed in relation to FIGS. 12 and 13 below.

Figure 12:
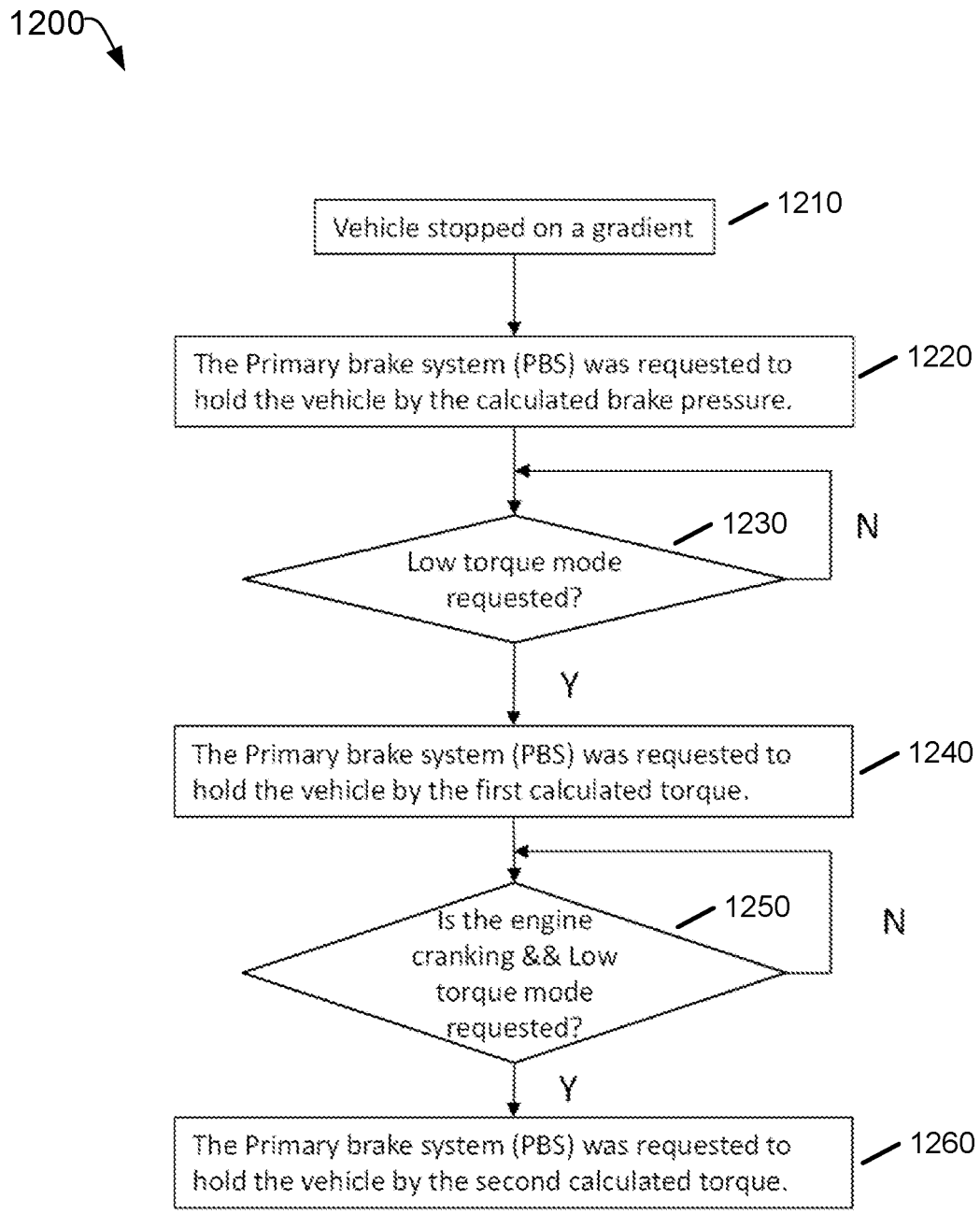
FIG. 12 is a flow diagram illustrating a method of applying a hysteresis of braking characteristics during operation, in accordance with aspects of the present disclosure.

FIG. 12 is a flow diagram 1200 illustrating a method of applying a hysteresis of braking characteristics during operation, in accordance with aspects of the present disclosure. The method may be applicable to hybrid or internal combustion engine vehicles, in which the engines may shut down during traffic stop and restarts when the traffic stop is over. The method may be performed by a processing logic (e.g., the AD control of FIG. 5), which may include software, hardware, or a combination thereof. As an example, the method illustrated in the flow diagram 1200 may be performed by the control module 306 of FIG. 3.

At operation 1210, the control module stops the vehicle on a gradient, such as by applying the braking system to decelerate the vehicle to a full stop.

At operation 1220, the control module uses a primary brake system (PBS) to hold the vehicle at a calculated braking pressure based on the gradient.

At operation 1230, the control module determines whether a low torque mode is requested. As described in FIG. 11, the low torque mode allows the vehicle to transition from the braking power of the braking system to the engine power for holding the vehicle still on a slope of a positive gradient. If the low torque mode is requested, at operation 1240, the control module requests the PBS to hold the vehicle by a first calculated torque in the low torque mode.

At operation 1250, the control module determines whether the engine cranking and the low torque mode requested. When the engine cranking is not requested, the control module continues to hold the vehicle by the first calculated torque using the PBS. When the engine cracking is requested, at operation 1260, the control module requests the PBS to hold the vehicle by the second calculated torque (e.g., based on a reduced electric current input). This way, the conserved electrical energy at the second calculated torque may facilitate the engine cranking (e.g., by reducing the amount of voltage drop and providing sufficient cranking current). An example of the voltage drop prevention using the method of the flow diagram 1200 is illustrated in FIG. 13.

Figure 13:
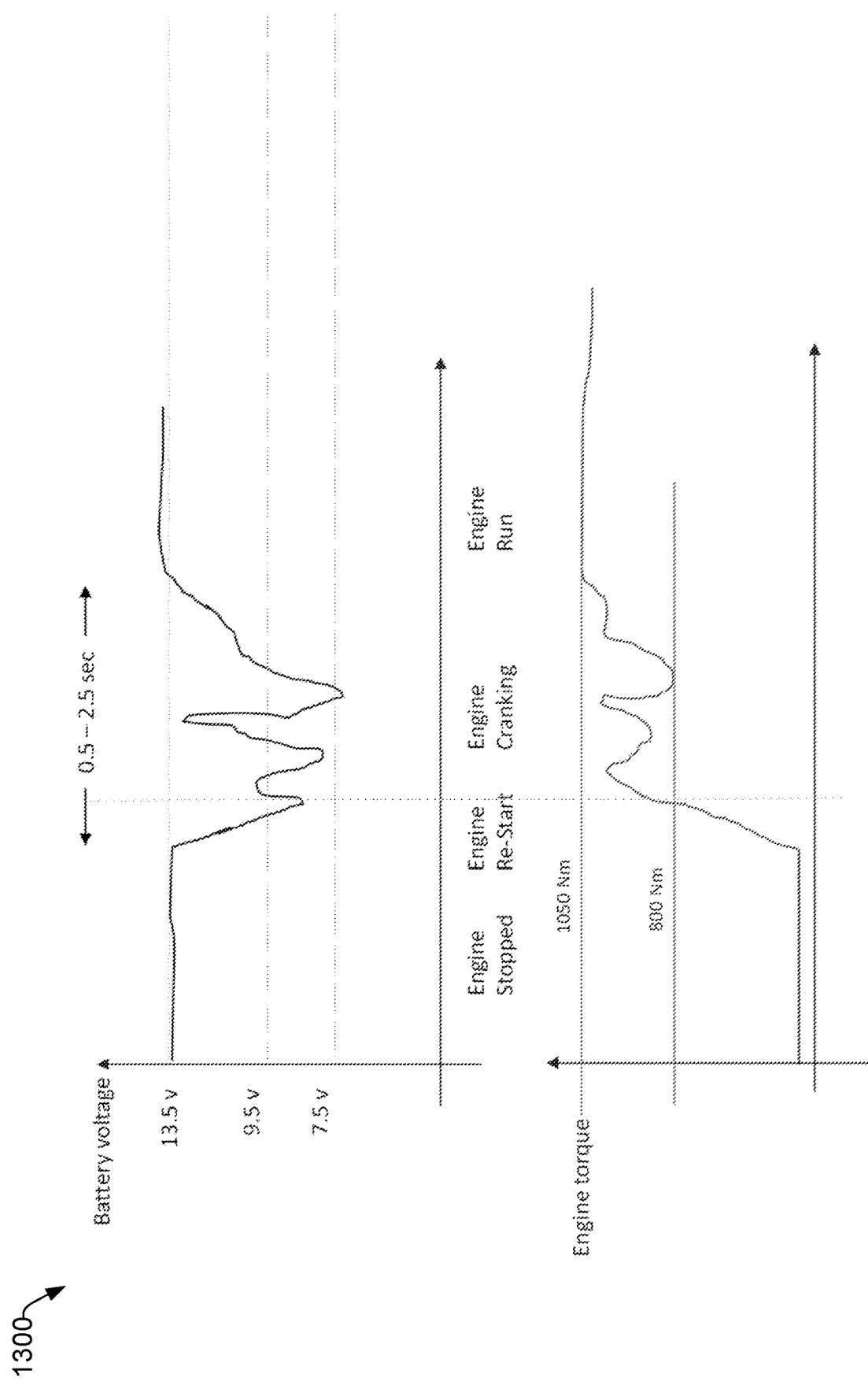
FIG. 13 illustrates example timelines of the engine torque and the battery voltage of the example method shown in FIG. 12, in accordance with aspects of the present disclosure.

FIG. 13 illustrates example timelines 1300 of the engine torque and the battery voltage of the example method shown in FIG. 12, in accordance with aspects of the present disclosure. As shown, during engine restart and engine cranking, substantial battery voltage drop may take place. The corresponding engine output torque may also drop correspondingly. Therefore, by reducing the electric current draw by the braking system during the engine restart and/or engine cranking operations, the substantial battery voltage drop is avoided.

Figure 14:
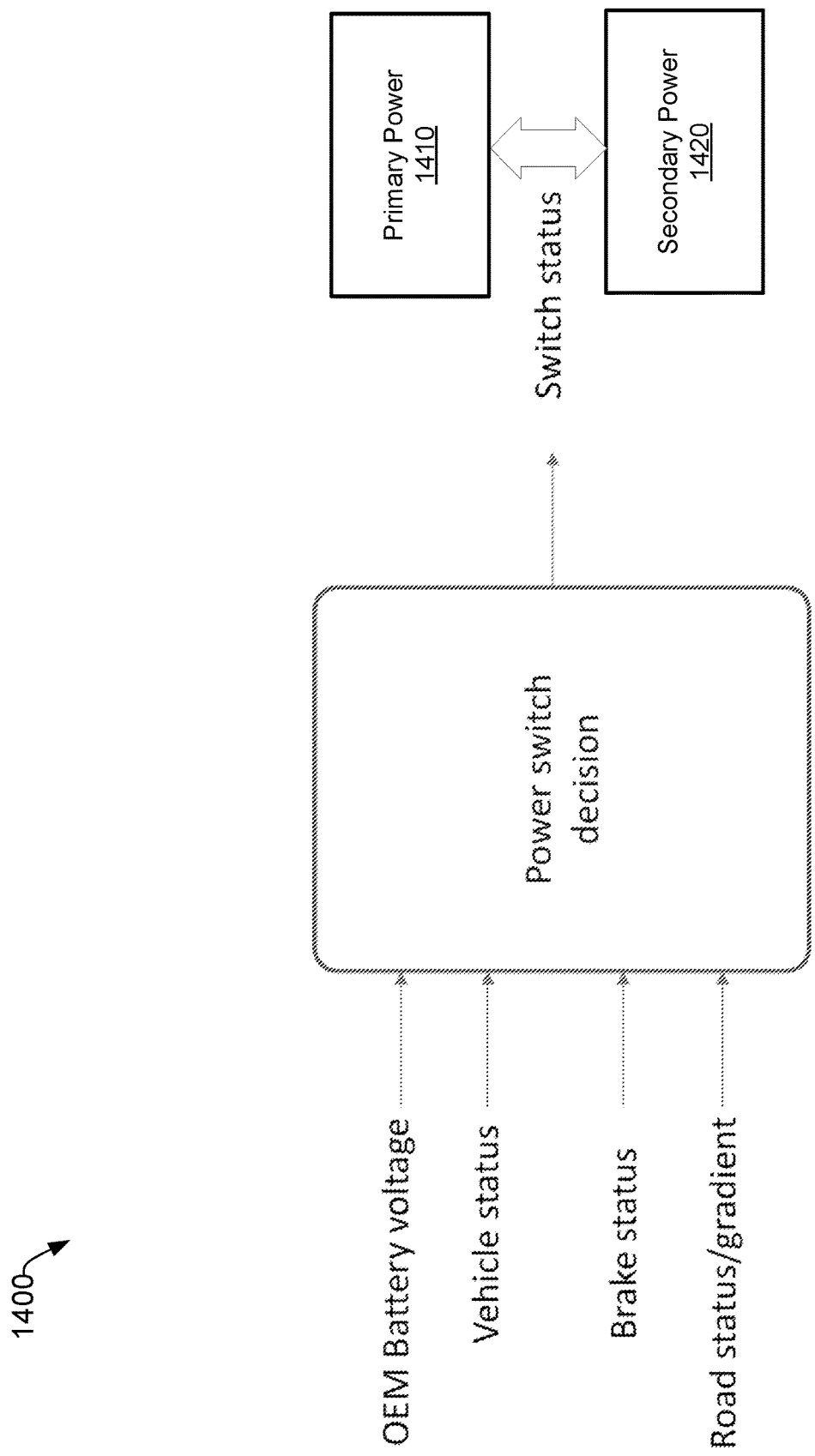
FIG. 14 illustrates an example of electrical power switching for implementing a hysteresis of braking characteristics, in accordance with aspects of the present disclosure.

FIG. 14 illustrates an example 1400 of electrical power switching for implementing a hysteresis of braking characteristics, in accordance with aspects of the present disclosure. As shown, the power switch operation may cause power switching between the primary power 1410 and the secondary power 1420. The power switching decision allows for real-time determination of the braking hysteresis characteristics. For example, the hysteresis determination module 910 may adjust the electrical current to reduce the braking torque for detecting when slipping occurs. Such real-time running feature may not be safe if the slipping may cause substantial vehicle movement. The power switching decision module of FIG. 14 may use one of the primary power 1410 or the secondary power 1420 as a backup energy source to instantly increase the electric current to boost the braking torque when slipping is detected, separate from the electric current decrease control. For example, when vehicle status has changed that prompt braking intervention, the alternative power source may be engaged to bypass the hysteresis determination module 910 in order to guarantee operational safety.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of reducing electrical current in vehicle braking for power conservation, the method comprising:
    applying a first electrical current to a braking system of a vehicle after the vehicle has ceased movement on a slope, the first electrical current preventing the vehicle from moving on the slope;
    determining a first braking pressure based on the first electrical current and the slope;
    determining a second electrical current based on the first braking pressure and a braking hysteresis, wherein the second electrical current is lower than the first electrical current; and
    reducing the first electrical current to the second electrical current in the braking system.

2. The computer-implemented method of claim 1, further comprising:
    determining that the vehicle is on the slope based on at least one of map information, sensor information, or feedback from the braking system.

3. The computer-implemented method of claim 1, wherein determining the second electrical current based on the first braking pressure and the braking hysteresis comprises:
    ascertaining the braking hysteresis in a look-up table constructed of values of braking pressures and torques measured at a plurality of brakes of the braking system, wherein the values of the braking pressures correspond to variable electrical current inputs to the braking system;
    identifying a required torque value in the look-up table based on the first electrical current; and
    determining the second electrical current in the look-up table based on the required torque value.

4. The computer-implemented method of claim 3, wherein the values of braking pressures and torques measured are scaled by a safety factor in the look-up table.

5. The computer-implemented method of claim 1, wherein determining the second electrical current based on the first braking pressure and the braking hysteresis comprises:
    monitoring the first braking pressure in the braking system as the first electrical current is applied;
    recording a first braking torque when the vehicle is ceasing movement on the slope;
    decreasing the first braking pressure for the vehicle to resume travel;
    monitoring a second braking pressure in the braking system and recording a second braking torque when the vehicle starts moving;
    validating or updating the braking hysteresis based on the first braking pressure, the first braking torque, the second braking pressure, and the second braking torque; and
    determining the second electrical current based on the validated or updated braking hysteresis and the second braking torque.

6. The computer-implemented method of claim 1, wherein determining the second electrical current based on the first braking pressure and the braking hysteresis comprises:
    measuring an output torque of an engine or a motor of the vehicle;
    measuring a gradient of the slope;
    computing a required braking torque based on the output torque and the gradient; and
    determining the second electrical current based on the required braking torque and the braking hysteresis.

7. The computer-implemented method of claim 1, further comprising at least one of:
    preventing a voltage of a power system of the vehicle from dropping below a threshold value; or
    storing electrical energy saved from reducing the first electrical current to the second electrical current for a high current outburst.

8. A computational device comprising:
    a memory; and
    a processing device coupled to the memory, the processing device and the memory configured to:
        apply a first electrical current to a braking system of a vehicle after the vehicle has ceased movement on a slope, the first electrical current preventing the vehicle from moving on the slope;

determine a first braking pressure based on the first electrical current and the slope;

determine a second electrical current based on the first braking pressure and a braking hysteresis, wherein the second electrical current is lower than the first electrical current; and reduce the first electrical current to the second electrical current in the braking system.

9. The computational device of claim 8, wherein the processing device and the memory are further configured to:

determine that the vehicle is on the slope based on at least one of map information, sensor information, or feedback from the braking system.

10. The computational device of claim 8, wherein the processing device and the memory are to determine the second electrical current based on the first braking pressure and the braking hysteresis by:

ascertaining the braking hysteresis in a look-up table constructed of values of braking pressures and torques measured at a plurality of brakes of the braking system, wherein the values of the braking pressures correspond to variable electrical current inputs to the braking system;

identifying a required torque value in the look-up table based on the first electrical current; and determining the second electrical current in the look-up table based on the required torque value.

11. The computational device of claim 10, wherein the values of braking pressures and torques measured are scaled by a safety factor in the look-up table.

12. The computational device of claim 8, wherein the processing device and the memory are to determine the second electrical current based on the first braking pressure and the braking hysteresis by:

monitoring the first braking pressure in the braking system as the first electrical current is applied;

recording a first braking torque when the vehicle is ceasing movement on the slope;

decreasing the first braking pressure for the vehicle to resume travel;

monitoring a second braking pressure in the braking system and recording a second braking torque when the vehicle starts moving;

validating or updating the braking hysteresis based on the first braking pressure, the first braking torque, the second braking pressure, and the second braking torque; and determining the second electrical current based on the validated or updated braking hysteresis and the second braking torque.

13. The computational device of claim 8, wherein the processing device and the memory are to determine the second electrical current based on the first braking pressure and the braking hysteresis by:

measuring an output torque of an engine or a motor of the vehicle;

measuring a gradient of the slope;

computing a required braking torque based on the output torque and the gradient; and determining the second electrical current based on the required braking torque and the braking hysteresis.

14. The computational device of claim 8, wherein the processing device and the memory are further configured to perform at least one of:

preventing a voltage of a power system of the vehicle from dropping below a threshold value; or storing electrical energy saved from reducing the first electrical current to the second electrical current for a high current outburst.

15. A non-transitory computer-readable storage medium having instructions stored thereon that, when executed by a processing device, cause the processing device to:

apply a first electrical current to a braking system of a vehicle after the vehicle has ceased movement on a slope, the first electrical current preventing the vehicle from moving on the slope;

determine a first braking pressure based on the first electrical current and the slope;

determine a second electrical current based on the first braking pressure and a braking hysteresis, wherein the second electrical current is lower than the first electrical current; and reduce the first electrical current to the second electrical current in the braking system.

16. The non-transitory computer-readable storage medium of claim 15, further comprising instructions to cause the processing device to:

determine that the vehicle is on the slope based on at least one of map information, sensor information, or feedback from the braking system.

17. The non-transitory computer-readable storage medium of claim 15, wherein to determine the second electrical current based on the first braking pressure and the braking hysteresis is to:

ascertain the braking hysteresis in a look-up table constructed of values of braking pressures and torques measured at a plurality of brakes of the braking system, wherein the values of the braking pressures correspond to variable electrical current inputs to the braking system;

identify a required torque value in the look-up table based on the first electrical current; and determine the second electrical current in the look-up table based on the required torque value.

18. The non-transitory computer-readable storage medium of claim 17, wherein the values of braking pressures and torques measured are scaled by a safety factor in the look-up table.

19. The non-transitory computer-readable storage medium of claim 15, wherein to determine the second electrical current based on the first braking pressure and the braking hysteresis is to:

monitor the first braking pressure in the braking system as the first electrical current is applied;

record a first braking torque when the vehicle is ceasing movement on the slope;

decrease the first braking pressure for the vehicle to resume travel;

monitor a second braking pressure in the braking system and recording a second braking torque when the vehicle starts moving;

validate or updating the braking hysteresis based on the first braking pressure, the first braking torque, the second braking pressure, and the second braking torque; and determine the second electrical current based on the validated or updated braking hysteresis and the second braking torque.

20. The non-transitory computer-readable storage medium of claim 15, wherein to determine the second electrical current based on the first braking pressure and the braking hysteresis is to:

measure an output torque of an engine or a motor of the vehicle;

measure a gradient of the slope;

compute a required braking torque based on the output torque and the gradient; and determine the second electrical current based on the required braking torque and the braking hysteresis.

\* \* \* \* \*